(12) United States Patent
Thiyagarajan et al.

(10) Patent No.: US 10,758,108 B2
(45) Date of Patent: Sep. 1, 2020

(54) HEATING ASSEMBLY FOR A WASHING APPLIANCE

(71) Applicant: Haier US Appliance Solutions, Inc., Wilmington, DE (US)

(72) Inventors: Ramasamy Thiyagarajan, Louisville, KY (US); Adam Christopher Hofmann, Louisville, KY (US); Timothy Kopera, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 240 days.

(21) Appl. No.: 15/866,597

(22) Filed: Jan. 10, 2018

(65) Prior Publication Data

US 2019/0208982 A1 Jul. 11, 2019

(51) Int. Cl.
*A47L 15/42* (2006.01)
*A47L 15/48* (2006.01)
*F28D 15/02* (2006.01)
*F28D 21/00* (2006.01)

(52) U.S. Cl.
CPC ......... *A47L 15/488* (2013.01); *A47L 15/4209* (2016.11); *F28D 15/0275* (2013.01); *F28D 21/0012* (2013.01); *A47L 15/4291* (2013.01); *A47L 15/483* (2013.01)

(58) Field of Classification Search
CPC ............. A47L 15/4209; A47L 15/4291; A47L 15/483; A47L 15/488; F28D 15/0275; F28D 21/0012
USPC ............ 134/18, 56 D, 57 D, 58 D, 105, 107, 134/115 R
See application file for complete search history.

(56) References Cited

U.S. PATENT DOCUMENTS

| 8,603,260 B2 | 12/2013 | Classen et al. |
| 2013/0333238 A1 | 12/2013 | Thiyagarajan |

FOREIGN PATENT DOCUMENTS

EP 2309052 B1 7/2013

*Primary Examiner* — Levon J Shahinian
(74) *Attorney, Agent, or Firm* — Dority & Manning, P.A.

(57) ABSTRACT

A dishwashing appliance includes a tub defining a wash chamber. The dishwashing appliance also includes an inlet defined in the tub and providing fluid communication into the wash chamber. A sump is positioned at a bottom of the wash chamber for receiving fluid from the wash chamber and a heater is in operative communication with the sump. The dishwashing appliance also includes a heat pipe heat exchanger having a condenser section and an evaporator section. The condenser section in operative communication with the wash chamber and the evaporator section is in operative communication with the sump.

17 Claims, 5 Drawing Sheets

HEATING ASSEMBLY FOR A WASHING APPLIANCE

FIELD OF THE INVENTION

The present subject matter relates generally to washing appliances, such as dishwashing appliances and, more particularly, to a heating assembly of a washing appliance and related methods.

BACKGROUND OF THE INVENTION

Dishwashing appliances generally include a tub that defines a wash chamber. Rack assemblies can be mounted within the wash chamber for receipt of articles for washing. Various cycles may be included as part of the overall cleaning process. For example, a typical, user-selected cleaning option may include a wash cycle and rinse cycle (referred to collectively as a wet cycle), as well as a drying cycle. In addition, spray-arm assemblies within the wash chamber may be used to apply or direct fluid towards the articles disposed within the rack assemblies in order to clean such articles. As is generally understood, dishwashing appliances may often include multiple spray-arm assemblies, such as a lower spray-arm assembly mounted to the tub at a bottom of the wash chamber, a mid-level spray-arm assembly mounted to one of the rack assemblies, and/or an upper spray-arm assembly mounted to the tub at a top of the wash chamber.

Moreover, dishwashing appliances are typically equipped with a fluid circulation system including a plurality of fluid circulation components for directing fluid to the spray-arm assemblies. Specifically, a pump is typically housed within a machine compartment of the dishwasher that is configured to pump fluid along a circulation flow path for subsequent delivery to the spray-arm assemblies. For example, the fluid discharged from the pump may be routed through a diverter assembly and/or one or more fluid conduits disposed along the circulation flow path prior to being delivered to the spray-arm assemblies.

Fluids used in the cleaning process may be heated. For example, the dishwasher may include one or more heat sources for heating fluids used in wash or rinse cycle and for providing heat during a drying cycle. As another example, the fluid directed through the fluid circulation system may be heated with integrated heating rods or other resistive heating element in the components of the fluid circulation system such as the circulation pump. However, a significant portion of the energy used to heat the fluids may be wasted when the hot fluids are discharged from the dishwasher after being applied to the articles.

Accordingly, an improved heating device for a dishwashing appliance that provides for improved energy usage would be welcomed in the technology.

BRIEF DESCRIPTION OF THE INVENTION

The present invention provides a dishwashing appliance having a heater and a heat pipe heat exchanger. The heater is configured to heat fluids, e.g., water and/or detergent or other additives, in the dishwashing appliance during one or more wet cycles. The heat pipe heat exchanger is configured to transfer heat from the fluids to a flow of air flowing into a wash chamber of the dishwashing appliance to promote drying of articles in the wash chamber after the wet cycle(s) are complete. Aspects and advantages of the invention will be set forth in part in the following description, or may be obvious from the description, or may be learned through practice of the invention.

In one aspect, the present subject matter is directed to a dishwashing appliance. The dishwashing appliance includes a tub defining a wash chamber. The dishwashing appliance also includes an inlet defined in the tub and providing fluid communication into the wash chamber. A sump is positioned at a bottom of the wash chamber for receiving fluid from the wash chamber and a heater is in operative communication with the sump. The dishwashing appliance also includes a heat pipe heat exchanger having a condenser section and an evaporator section. The condenser section in operative communication with the wash chamber and the evaporator section is in operative communication with the sump.

In another aspect, the present subject matter is directed to a method of operating a dishwashing appliance. The method includes flowing a liquid into a sump of the dishwashing appliance. The method also includes circulating the liquid between the sump and a wash chamber of the dishwashing appliance. The method further includes heating the liquid to a first temperature while circulating the liquid and heating the liquid to a second temperature after circulating the liquid. After heating the liquid to the second temperature, the method includes transferring heat from the liquid to a flow of air flowing into the wash chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
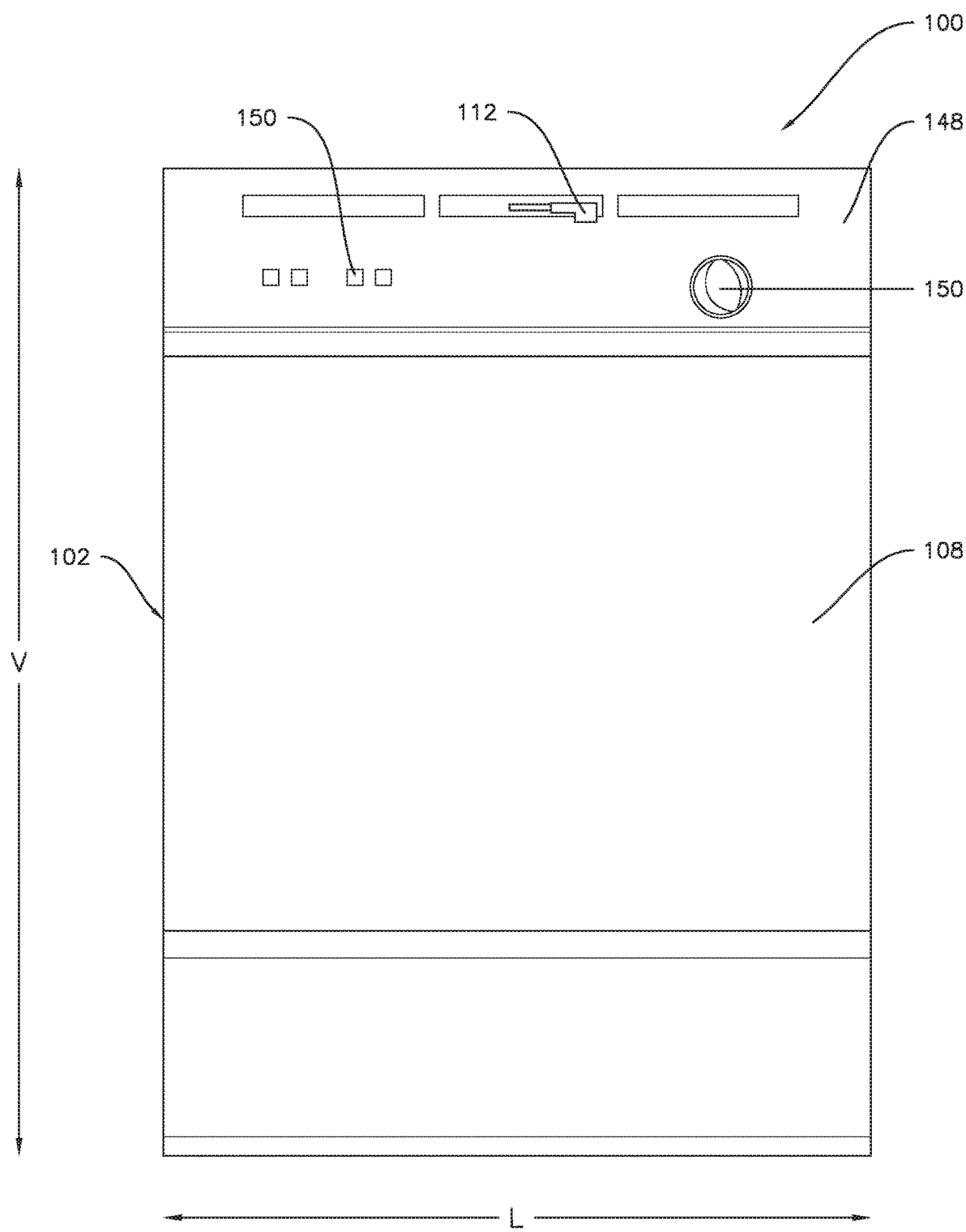
FIG. 1 illustrates a front view of one embodiment of a dishwashing appliance in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
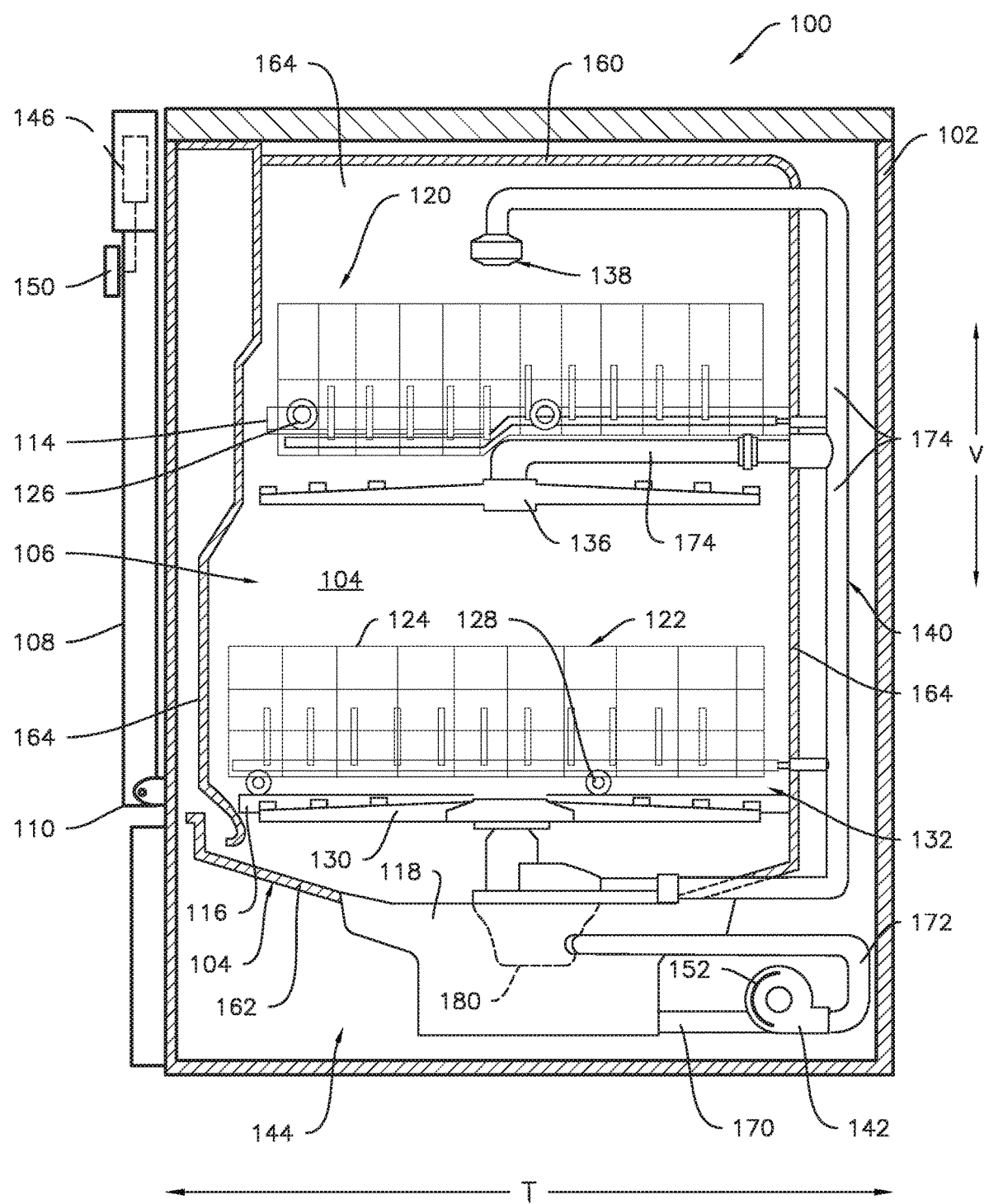
FIG. 2 illustrates a cross-sectional side view of the dishwashing appliance shown in FIG. 1, particularly illustrating various internal components of the dishwashing appliance.

Referring now to the drawings, FIGS. 1 and 2 illustrate one embodiment of a domestic dishwashing appliance 100 that may be configured in accordance with aspects of the present disclosure. As shown in FIGS. 1 and 2, the dishwashing appliance 100 may define a vertical direction V, a lateral direction L, and a transverse direction T, which are mutually perpendicular. The dishwashing appliance 100 may include a cabinet 102 having a tub 104 therein defining a wash chamber 106. The tub 104 may generally include a front opening (not shown) and a door 108 hinged at its bottom 110 for movement between a normally closed vertical position (shown in FIGS. 1 and 2), wherein the wash chamber 106 is sealed shut for washing operation, and a horizontal open position for loading and unloading of articles from the dishwasher. As shown in FIG. 1, a latch 112 may be used to lock and unlock the door 108 for access to the chamber 106.

As is understood, the tub 104 may generally have a rectangular cross-section defined by various wall panels or walls. For example, as shown in FIG. 2, the tub 104 may include a top wall 160 and a bottom wall 162 spaced apart from one another along a vertical direction V of the dishwashing appliance 100. Additionally, the tub 104 may include a plurality of sidewalls 164 (e.g., four sidewalls) extending between the top and bottom walls 160, 162. It should be appreciated that the tub 104 may generally be formed from any suitable material. For example, in several embodiments, the tub 104 may be formed from a ferritic material, such as stainless steel, or a polymeric material.

As particularly shown in FIG. 2, upper and lower guide rails 114, 116 may be mounted on opposing side walls 164 of the tub 104 and may be configured to accommodate roller-equipped rack assemblies 120 and 122. Each of the rack assemblies 120, 122 may be fabricated into lattice structures including a plurality of elongated members 124 (for clarity of illustration, not all elongated members making up assemblies 120 and 122 are shown in FIG. 2). Additionally, each rack 120, 122 may be adapted for movement between an extended loading position (not shown) in which the rack is substantially positioned outside the wash chamber 106, and a retracted position (shown in FIGS. 1 and 2) in which the rack is located inside the wash chamber 106. This may be facilitated by rollers 126 and 128, for example, mounted onto racks 120 and 122, respectively. As is generally understood, a silverware basket (not shown) may be removably attached to rack assembly 122 for placement of silverware, utensils, and the like, that are otherwise too small to be accommodated by the racks 120, 122.

Additionally, the dishwashing appliance 100 may also include a lower spray-arm assembly 130 that is configured to be rotatably mounted within a lower region 132 of the wash chamber 106 directly above the bottom wall 162 of the tub 104 so as to rotate in relatively close proximity to the rack assembly 122. As shown in FIG. 2, a mid-level spray-arm assembly 136 may be located in an upper region of the wash chamber 106, such as by being located in close proximity to the upper rack 120. Moreover, an upper spray assembly 138 may be located above the upper rack 120.

As is generally understood, the lower and mid-level spray-arm assemblies 130, 136 and the upper spray assembly 138 may generally form part of a fluid circulation system 140 for circulating fluid (e.g., water and dishwasher fluid) within the tub 104. As shown in FIG. 2, the fluid circulation system 140 may also include a pump 142, sometimes referred to as a circulation pump or wash pump, located in a machinery compartment 144 below the bottom wall 162 of the tub 104, as is generally recognized in the art, and one or more fluid conduits for circulating the fluid delivered from the pump 142 to and/or throughout the wash chamber 106. The tub 104 may include a sump 118 positioned at a bottom of the wash chamber 106 for receiving fluid from the wash chamber 106. The circulation pump 142 receives fluid from sump 118 to provide a flow to fluid circulation system 140. Thus, the circulation pump 142 may pump the liquid from the sump 118 to the wash chamber 106 under pressure and the liquid may ultimately return to the sump 118 from the wash chamber 106 via gravity where the sump 118 is below the wash chamber 106. For example, as shown in FIG. 2, first and second pump conduits 170, 172 may be in fluid communication with the pump 142, with the first pump conduit 170 being configured to deliver fluid to the pump 142 from the sump 118 and the second pump conduit 172 being configured to deliver the fluid from the pump 142 to a diverter assembly 180 of the fluid circulation system 140. In addition, one or more fluid conduits may be positioned downstream of the diverter assembly 180 for directing fluid to one or more of the spray arm assemblies 130, 136, 138. For example, as shown in FIG. 2, a fluid conduit 174 may be in fluid communication with the diverter assembly 180 for directing fluid to the mid-level and upper spray arm assemblies 136, 138.

Figure 3:
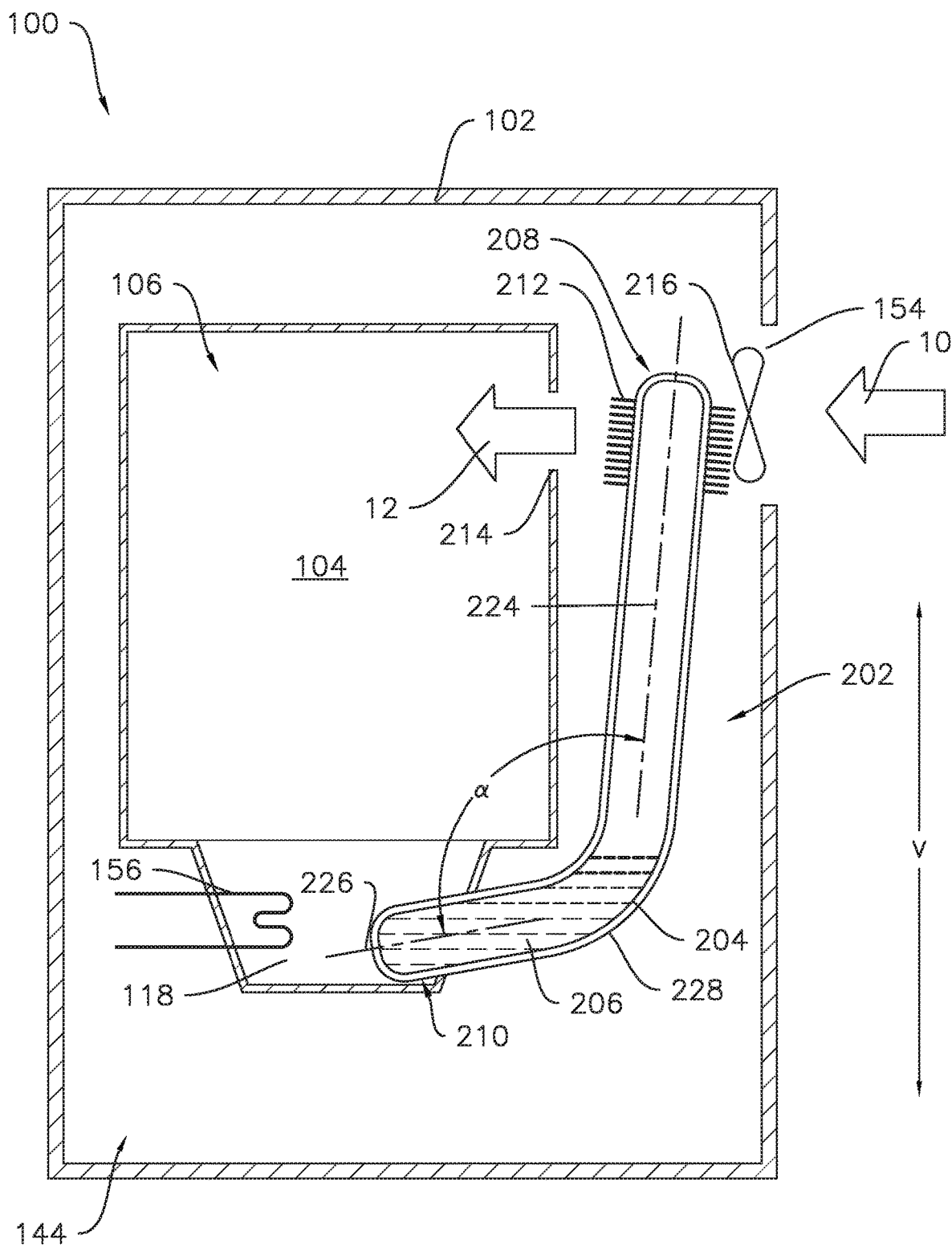
FIG. 3 illustrates a schematic view of a heating system for a dishwashing appliance according to one or more embodiments of the present disclosure.

In various embodiments, a heater for heating the fluid is also provided. In some embodiments, a heating element may be provided in operative communication with one or more components of the fluid circulation system 140. In various embodiments, the heater or heating element may be in operative communication with the one or more components of the fluid circulation system 140 in that the heating element is operable to provide thermal energy, e.g., heat, to the one or more components and/or fluid flowing within the one or more components. In some embodiments, the heating element may be physically connected to the one or more components for heat transfer thereto. In other embodiments, the heating element may be provided in close proximity to the one or more components, where such proximity is sufficiently close for thermal energy produced by the heating element to be transferred to the one or more components. For example, the heating element may be provided in operative communication with one of the first and second pump conduits 170 or 172 or fluid conduit 174. As illustrated for example in FIG. 2, an inline heating element 152 (sometimes also referred to as an "inline heater") may be provided in operative communication with the pump 142, e.g., the inline heating element 152 may be provided as a resistance heating element such as a heating rod which is integrated with and at least partially encircles the pump 142. In other embodiments, for example as illustrated in FIG. 3, the heater may be provided separate from the components of the fluid circulation system 140, e.g., a submersible resistance heating element 156 may be provided, e.g., positioned within the sump 118. In embodiments wherein such heater is provided, e.g., one or both of the inline heating element 152 and the submersible resistance heating element 156, the heater may be in operative communication with the sump, e.g., the heater may be in or close to the sump, whereby water in the sump 118 may be heated by activating the heater.

Turning again to FIG. 2, each spray-arm assembly 130, 136 may include an arrangement of discharge ports or orifices for directing washing liquid onto dishes or other articles located in rack assemblies 120 and 122, which may provide a rotational force by virtue of washing fluid flowing through the discharge ports. The resultant rotation of the lower spray-arm assembly 130 provides coverage of dishes and other dishwasher contents with a washing spray.

The dishwashing appliance 100 may be further equipped with a controller 146 configured to regulate operation of the dishwasher 100. The controller 146 may generally include one or more memory devices and one or more microprocessors, such as one or more general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 146 may be positioned in a variety of locations throughout dishwashing appliance 100. In the illustrated embodiment, the controller 146 is located within a control panel area 148 of the door 108, as shown in FIG. 1. In such an embodiment, input/output ("I/O") signals may be routed between the control system and various operational components of the dishwashing appliance 100 along wiring harnesses that may be routed through the bottom 110 of the door 108. Typically, the controller 146 includes a user interface panel/controls 150 through which a user may select various operational features and modes and monitor progress of the dishwasher 100. In one embodiment, the user interface 150 may represent a general purpose I/O ("GPIO") device or functional block. Additionally, the user interface 150 may include input components, such as one or more of a variety of electrical, mechanical or electro-mechanical input devices including rotary dials, push buttons, and touch pads. The user interface 150 may also include a display component, such as a digital or analog display device designed to provide operational feedback to a user. As is generally understood, the user interface 150 may be in communication with the controller 146 via one or more signal lines or shared communication busses. It should be noted that controllers 146 as disclosed herein are capable of and may be operable to perform any methods and associated method steps as disclosed herein.

As indicated above, the fluid circulation system 140 may also include a diverter assembly 180 in fluid communication with the pump 142. In general, the diverter assembly 180 may be configured to direct fluid to one or more of the spray-arm assemblies 130, 136, 138. For example, in one embodiment, the diverter assembly 180 my include a first outlet (not shown) for directing fluid received from the pump 142 to the lower spray-arm assembly 130 and a second outlet (not shown) for directing the fluid received from the pump 142 to the mid-level and upper spray-arm assemblies 136, 138 (e.g., via the conduit 174). In such an embodiment, the diverter assembly 180 may also include a diverter valve (not shown) for diverting the flow of fluid through the assembly 180 to either its first outlet or its second outlet.

It should be appreciated that the present subject matter is not limited to any particular style, model, or configuration of dishwashing appliance. The exemplary embodiment depicted in FIGS. 1 and 2 is simply provided for illustrative purposes only. For example, different locations may be provided for the user interface 150, different configurations may be provided for the racks 120, 122, and other differences may be applied as well.

Figure 4:
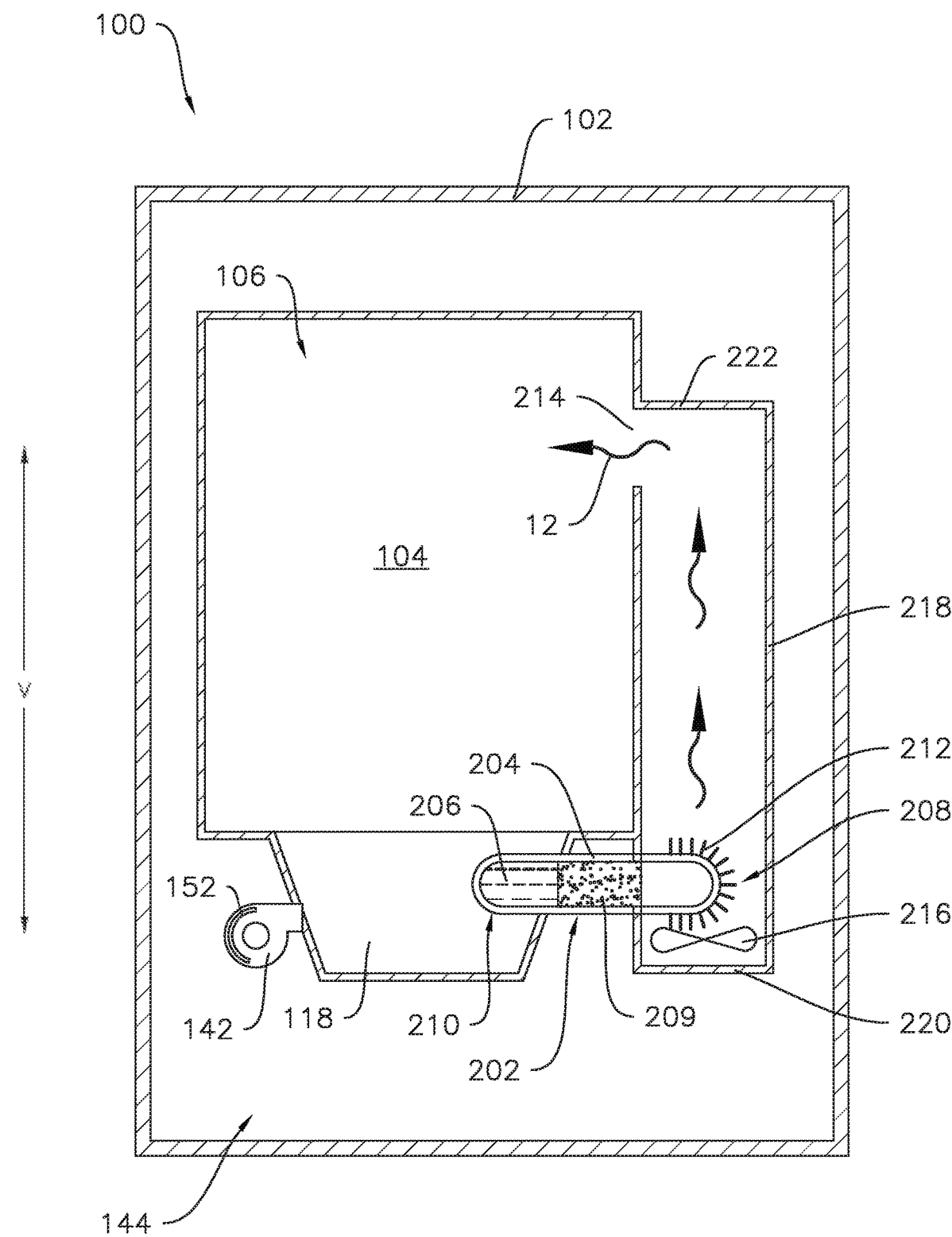
FIG. 4 illustrates a schematic view of a heating system for a dishwashing appliance according to one or more additional embodiments of the present disclosure.

As illustrated in FIGS. 3 and 4, the dishwashing appliance 100 may include a heat pipe heat exchanger 202, sometimes referred to herein as a "heat pipe." As shown in FIG. 3, the heat pipe 202 includes a sealed casing 204 containing a working fluid 206 in the casing 204. The casing 204 is preferably constructed of a material with a high thermal conductivity, such as a metal, such as copper or aluminum. In some embodiments, the working fluid 206 may be water. In other embodiments, suitable working fluids for the heat pipe 202 include acetone, methanol, ethanol, or toluene. Any suitable fluid may be used for working fluid 206, e.g., any fluid that is compatible with the material of the casing 204 and is suitable for the desired operating temperature range. The heat pipe 202 extends between a condenser section 208 and an evaporator section 210. The working fluid 206 contained within the casing 204 of the heat pipe 202 absorbs thermal energy at the evaporator section 210, whereupon the working fluid 206 travels in a gaseous state from the evaporator section 210 to the condenser section 208. At the condenser section 208, the gaseous working fluid 206 condenses to a liquid state and thereby releases thermal energy. In particular embodiments, a fan or blower, such as fan 216 described hereinbelow, may be provided proximate to the condenser section 208 and configured to flow air around the condenser section 208, thus providing an increased rate of thermal transfer as compared to stagnant air, e.g., air that is not provided with motive force by the fan or blower. A plurality of fins 212 may be provided on an external surface of the casing 204 at either or both of the condenser section 208 and the evaporator section 210. The fins 212 may provide an increased contact area between the heat pipe 202 and air flowing around the heat pipe 202, e.g., at the condenser section 208 as illustrated in FIGS. 3 and 4, for improved transfer of thermal energy. The fins 212 may provide an increased contact area between the heat pipe 202 and air flowing around the heat pipe 202 for improved transfer of thermal energy. Thus, the fins 212 are particularly advantageous at the condenser section 208 which is operable to provide heat to the air 10.

One of skill in the art will recognize that the heat pipe 202 may be activated when the fan 216 operates, e.g., when the fan 216 urges ambient air 10 about the condenser section 208 such that thermal energy is transferred from the condenser section 208 to the air 10. As the working fluid 206 in the condenser section 208 becomes relatively cool the working fluid 206 will condense and flow in liquid form to the evaporator section 210, e.g., by gravity and/or capillary flow. Thus, as one of ordinary skill would recognize, the heat transfer may be initiated upon activating the fan 216 and thereby activating the heat pipe 202. Accordingly, at times when transfer of heat from the liquid in the sump 118 is not desired, e.g., during a wash cycle of the dishwasher appliance 100, the heat pipe 202 may be inactive when the fan 216 is not operating.

The heat pipe 202 may include an internal wick structure 209 (FIG. 4) to transport liquid working fluid 206 from the condenser section 208 to the evaporator section 210 by capillary flow. In some embodiments, the heat pipe 202 may be constructed and arranged such that the liquid working fluid 206 returns to the evaporator section 210 by gravity flow, including solely by gravity flow. For example, as illustrated in FIG. 3, the dishwasher appliance 100 may be constructed such that the heat pipe 202 may be arranged with the condenser section 208 positioned above the evaporator section 210 along the vertical direction V such that condensed working fluid 206 in a liquid state may flow from the condenser section 208 to the evaporator section 210 by gravity. In such embodiments, where the liquid working fluid 206 may return to the evaporator section 210 by gravity, the wick structure may be omitted whereby the liquid working fluid 206 may return to the evaporator section 210 solely by gravity flow. Thus, the embodiment of FIG. 3 may advantageously provide a reduced cost and simpler heat pipe 202 by omitting the wick structure 209. Other embodiments, such as is illustrated in FIG. 4 may advantageously provide a relatively shorter overall length heat pipe 202 which may promote an increased efficiency of thermal transfer as compared to a longer heat pipe. The length of the heat pipe 202 may generally be defined with respect to the distance, along the shape of the heat pipe 202, between the condenser section 208 and the evaporator section 210, e.g., the distance that the working fluid 206 may travel during operation of the heat pipe 202.

As illustrated for example in FIG. 3, the heat pipe 202 may include a bend 228 between the condenser section 208 and the evaporator section 210. The bend 228 may define an arcuate shape, as shown in FIG. 3. The bend 228 is preferably not a sharp bend. As illustrated for example in FIG. 3, the condenser section 208 and the evaporator section 210 may be disposed at an angle α. The sharpness of the bend 228 may be defined by or proportional to the angle α. The angle α is supplementary to the bend angle defined by bend 228. The angle α may be the angle subtended by the arcuate bend 228. As shown in FIG. 3, the tub 106 is positioned within the interior of the angle α. The angle α may be greater than ninety degrees. In particular, the condenser section 208 may define a centerline 224, and the evaporator section 210 may define a centerline 226, where the angle α may be defined between the centerlines 224 and 226. The centerline 224 of the condenser section 208 may be within about fifteen degrees of the vertical direction V, such as about ten degrees from the vertical direction V, and/or may form an angle of at least five degrees with respect to the vertical direction V. In particular, the centerline 224 of the condenser section 208 may diverge from the vertical direction V, e.g., as the heat pipe 202 extends away from the bend 228 towards the condenser section 208, the distance between the tub 104 and the heat pipe 202 may increase. Similarly, the centerline 226 of the evaporator section 210 may be within about fifteen degrees of a horizontal direction, e.g., one of the lateral direction L or the transverse direction T, such as about ten degrees from the horizontal direction, and/or may form an angle of at least five degrees with respect to the horizontal direction. In particular, the centerline 226 of the evaporator section 210 may diverge from the horizontal direction, e.g., as the heat pipe 202 extends away from the bend 228 towards the evaporator section 210, the distance between the tub 104 and the heat pipe 202 may increase. In various embodiments, the condenser section 208 may be oriented along the vertical direction V and the evaporator section 210 may be oriented along one of the lateral direction L or the transverse direction T; or, one or both of the condenser section 208 and the evaporator section 210 may diverge from the respective direction as described above. Where the angle α is greater than ninety degrees, the bend 228 is less sharp than if the angle α were ninety degrees or less, which may advantageously provide improved flow between the condenser section 208 and the evaporator section 210. The angle α may be considered an internal angle of the heat pipe 202. The angle α may be the smallest angle defined between the centerline 224 of the condenser section 208 and the centerline 226 of the evaporator section 210. The angle α may be measured between the centerline 224 of the condenser section 208 and the centerline 226 of the evaporator section 210 in a direction that passes through the tub 106.

As illustrated for example in FIG. 4, in some embodiments, the dishwashing appliance 100 may include a heating conduit 218 extending between the sump 118 and the inlet 214. The heating conduit 218 may be configured to provide a flow of air to the condenser section 208 of the heat pipe 202. Thus, it is to be understood that the heating conduit 218 is generally not in fluid communication with the sump 118 such that liquid from the sump 118 generally will not enter the heating conduit 218. The heating conduit 218 may be in thermal communication with the sump 118, in particular when the fan 216 is operating such that the heat pipe 202 is activated, the heating conduit 218 may be in thermal communication with the sump 118 via the heat pipe 202. Thus, the heating conduit 218 may be in fluid communication with the inlet 214 and may be in thermal communication with the sump 118. As such, the heating conduit 218 may provide thermal communication between the sump 118 and the inlet 214. The heating conduit 218 may provide thermal communication between the heat pipe 202 and the inlet 214 into the wash chamber 106. The heating conduit 218 may provide fluid communication, e.g., in the form of a stream of air 12, from the condenser section 208 of the heat pipe 202 to the inlet 214 of the tub 104. The heating conduit 218 may include an upstream end 220 and a downstream end 222 spaced apart from the upstream end 220. The condenser section 208 of the heat pipe 202 may be positioned at the upstream end 220 of the heating conduit 218. The fan 216 may be positioned proximate to the condenser section 208, e.g., the fan 216 may be positioned in the upstream end 220 of the heating conduit 218. The downstream end 222 of the heating conduit 218 may be positioned at the inlet 214, e.g., the downstream end 222 may be in direct fluid communication with the inlet 214. As used herein, "upstream" and "downstream" are with respect to the flow of air through the dishwashing appliance 100. Accordingly, for example, the wash chamber 106 is downstream of the intake 154.

As illustrated in FIGS. 3 and 4, the evaporator section 210 may be in operative communication with the sump 118, e.g., the evaporator section 210 may be physically connected to or proximate to the sump 118 such that heat from fluid in the sump 118 may be transferred to the evaporator section 210 and to working fluid 206 in the evaporator section 210. In some embodiments, the evaporator section 210 may be in operative communication with the sump 118 in that the evaporator section 210 is positioned within the sump 118, as depicted in the illustrated example embodiments. Being so positioned, the evaporator section 210 of the heat pipe 202 may absorb thermal energy from water stored in the sump 118, whereupon gaseous working fluid 206 travels to the condenser section 208. Thus, the heat pipe 202 may generally capture heat from water in the sump 118 and transfer the heat to ambient air 10 (FIG. 3) or to air within a heating conduit 218 (FIG. 4) to provide hot air 12, as described in more detail below. Accordingly, the thermal energy of hot water in the sump 118 may be utilized by transferring the thermal energy to an air flow before draining the water from the sump 118. Discussion herein with respect to "water," e.g., which may be stored in the sump 118, should be understood as inclusive of various other matter as will be generally understood in the art, such as entrained soil particles, detergent, etc., in addition to pure water.

As illustrated in FIGS. 3 and 4, the tub 104 may include an inlet 214 defined in the tub 104. The inlet 214 may provide fluid communication into the wash chamber 106, e.g., the inlet 214 may be in direct fluid communication with the wash chamber 106. The dishwashing appliance 100 may also include a fan 216 configured to urge hot air 12 through the inlet 214. For example, in some embodiments, the fan 216 may be configured to urge air 10 from an ambient environment through the inlet 214, e.g., as illustrated in FIG. 3. In such embodiments, where the inlet 214 is in fluid communication with the ambient atmosphere, ambient air 10 may pass through intake 154, e.g., the ambient air 10 may be urged from the ambient environment through the intake 154 by the fan 216, such that the ambient air 10 passes over and around the condenser section 208 to provide a flow of hot dry air 12 to the wash chamber 106. As used herein, the ambient environment refers to the area externally around the dishwashing appliance 100, e.g., the ambient environment in close proximity to an exterior of the dishwashing appliance 100, such as the immediate surroundings of the dishwashing appliance 100 from which air may be drawn directly into the intake 154. As another example, in other embodiments, the fan 216 may be configured to urge air from a heating conduit 218 through the inlet 214, e.g., as illustrated in FIG. 4. In various embodiments, the condenser section 208 of the heat pipe 202 may be in operative communication with the inlet 214 upstream of the wash chamber 106 such that thermal energy released by the condensing working fluid 206 in the condenser section 208 may be transferred to the inlet 214 and/or air flowing therethrough. For example, as illustrated in FIG. 3, the condenser section 208 may be positioned at or proximate to the inlet 214. In other embodiments, for example as illustrated in FIG. 4, the condenser section 208 may be spaced apart from the inlet 214 and in operative communication with the inlet 214 via an intermediate structure, such as the heating conduit 218 illustrated in FIG. 4.

The flow of hot dry air 12 may travel from the inlet 214 through the wash chamber 106 to promote drying of dishes or other articles located in rack assemblies 130 and 132 within the wash chamber 106, whereupon the hot dry air 12 imparts thermal energy to and receives moisture from the articles and/or the wash chamber 106. Where the hot dry air 12 is heated by the condenser section 208 of the heat pipe 202, the condenser section 208 is thereby in operative communication with the wash chamber 106. In the illustrated example embodiments, the condenser section 208 is in operative communication with the wash chamber 106 via the inlet 214 and/or heating conduit 218 where heat from the condenser section 208 is transferred to the wash chamber 106 by hot air 12. Where the evaporator section 210 of the heat pipe 202 is in operative communication with the sump 118, as described above, the temperature of the hot dry air 12 will be approximately the same as the temperature of the liquid in the sump 118, depending at least in part on the efficiency of the heat pipe 202. Accordingly, the temperature of the liquid in the sump 118 may be adjusted to provide a desired or optimal temperature of the hot air 12 for drying. For example, as described in more detail below, operation of the dishwashing appliance 100 may include a pre-dry cycle wherein the liquid in the sump 118 is heated to a pre-set temperature whereby the heat from the liquid at the pre-set temperature may be transferred to the air 12 to promote drying of articles in the dishwashing appliance 100. As used herein, "hot air" includes air having a temperature higher than an ambient temperature. For example, the ambient temperature may range from about 65° F. to about 85° F. Accordingly, "hot air" may be at least about 90° F., such as at least about 100° F., such as between about 150° F. and about 250° F., such as between about 160° F. and about 190° F., such as about 180° F. As used herein, terms of approximation, such as "generally," or "about" include values within ten percent greater or less than the stated value. For example, "about 180° F." includes from 162° F. to 198° F. As used herein, "dry air" includes air having a relative humidity less than about twenty percent, such as less than about fifteen percent, such as less than about ten percent, such as less than about five percent, such as about zero.

Figure 5:
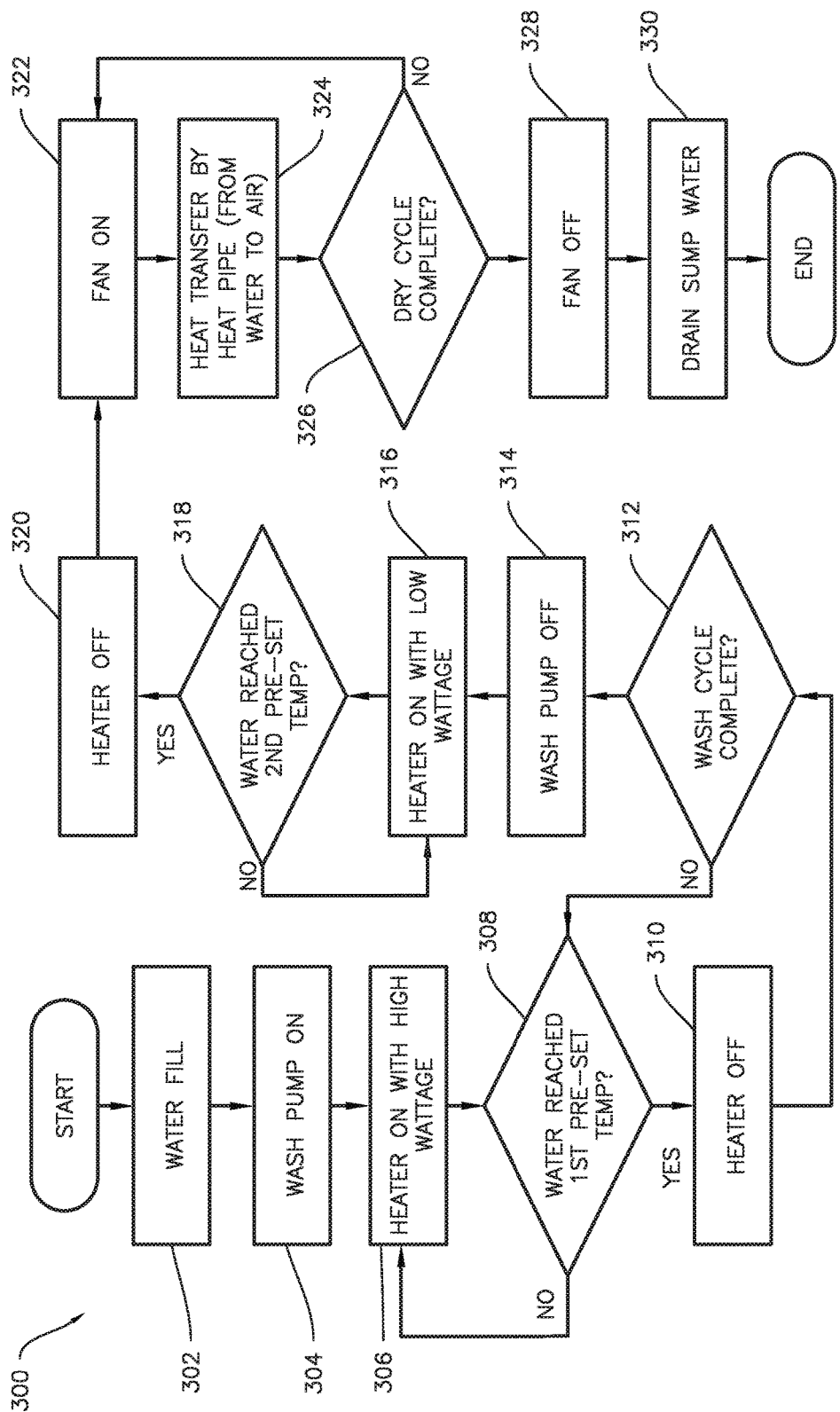
FIG. 5 illustrates a flow diagram of an exemplary method of operating a dishwashing appliance according to one or more embodiments of the present disclosure.

FIG. 5 illustrates an exemplary method 300 of operating a dishwashing appliance, such as dishwashing appliance 100. As illustrated, method 300 includes an initial fill water step 302. The fill water step 302 may include flowing a liquid into the sump 118 of the dishwashing appliance 100, e.g., as noted above the "water" in the fill water step may include detergent or other additives. Method 300 may further include a step 304 of activating the circulation pump 142 of the fluid circulation system 140 to circulate the water throughout the wash chamber 106 and between the sump 118 and the wash chamber 106. Method 300 may also include a step 306 of activating a heater, e.g., the inline heating element 152 and/or the submersible heating element 156. Activating the heater includes supplying power to the heater at a power level greater than zero such that thermal energy is produced by the heater. For example, in some embodiments, step 306 may include activating the heater at a first level, such as between about six hundred Watts (600 W) and about one thousand Watts (1000 W), such as about eight hundred Watts (800 W). As noted above, water in the sump 118 may be heated by activating the heater, thus, where step 306 includes activating the heater, the step 306 also includes heating the water in the sump 118. In particular, step 306 may include heating the liquid while circulating the liquid, e.g., the circulation pump 142 and the heater may both be active. At step 308, method 300 includes determining whether the water has reached a first pre-set temperature. The first pre-set temperature may be any suitable temperature for washing or rinsing articles within the dishwashing appliance 100. For example, the first pre-set temperature may be a hot rinse temperature of between about one hundred degrees Fahrenheit (100° F.) and about one hundred sixty degrees Fahrenheit (160° F.), such as about one hundred degrees Fahrenheit (140° F.). When the water in the sump 118 has not reached the first pre-set temperature at step 308, the method 300 may return to step 306 and keep the heater on. When the water in the sump 118 has reached the first pre-set temperature at step 308, the method 300 may proceed to step 310 and deactivate the heater. After deactivating the heater at step 310, the method 300 may include determining, at step 312, whether the wet cycle of the dishwashing appliance 100, e.g., a wash and/or rinse cycle, is complete. When the wet cycle, e.g., wash cycle, is not complete at 312, the method 300 returns to step 308 and continues to monitor the temperature of the water in the sump 118.

When the wet cycle is complete, the method 300 proceeds to a pre-dry cycle beginning with step 314 of deactivating or turning off the pump 142. The pre-dry cycle may advantageously permit adjusting of the temperature of water or liquid in the sump 118 to a desired temperature for a dry cycle subsequent to the pre-dry cycle. The pre-dry cycle also includes heating the liquid to a second temperature after circulating the liquid. In various embodiments, the second temperature may be the same as or different from the first temperature. The second temperature may be a predetermined desired temperature for optimal heat transfer to an air stream for use in the dry cycle, as described above. In some embodiments, the second temperature may be greater than the first temperature. For example, the method 300 may include a step 316 of turning the heater on with low wattage, e.g., activating the heater at a second level lower than the first level. For example, in some embodiments, step 316 may include activating the heater at the second level of between about two hundred Watts (200 W) and about six hundred Watts (600 W), such as about four hundred Watts (400 W). After activating the heater at the second level, the method 300 may include monitoring the temperature of the water in the sump 118 to determine at step 318 whether the water has reached a second pre-set temperature. As mentioned above, the second pre-set temperature may be the same as or different from, e.g., greater than, the first pre-set temperature. When the water has not reached the second pre-set temperature at step 318, the method 300 may return to step 316 and keep the heater on.

When the water has reached the second pre-set temperature, the method 300 may proceed from the pre-dry cycle to a dry cycle. In some embodiments, the dry cycle may begin at step 320 of deactivating the heater. In other embodiments, the dry cycle may begin at step 322 of activating the fan 216, e.g., the heater and the fan 216 may operate at the same time and/or for overlapping periods of time. As described above, step 322 of activating the fan 216 activates the heat pipe 202, to initiate step 324 of transferring heat via the heat pipe 202 from the water in the sump 118 to the air, e.g., the ambient air 10 or the air in heating conduit 218. Thus, the dry cycle generally includes transferring heat from the liquid in the sump 118 to the flow of air 12 flowing into the wash chamber 106 after heating the liquid to the second pre-set temperature. Moreover, in various embodiments, the heater and the fan may operate consecutively and/or concurrently at the initiation of the dry cycle.

At step 326, method 300 includes determining that the dry cycle is complete, e.g., that articles such as dishes within the wash chamber 106 are dry, for example based on a set amount of time programmed into the controller 146. When the dry cycle is complete, method 300 may further include a step 328 of deactivating the fan 216. Method 300 may further include a drain water step 330. For example, a drain pump (not shown) may be activated to drain the liquid from the sump 118.

As noted above, features illustrated or described as part of one embodiment can be used with another embodiment to yield a still further embodiment. For example, some embodiments may include the submersible heating element 156 of FIG. 3 with the heating conduit 218 and shorter heat pipe 202 of FIG. 4. As another example, some embodiments may include the inline heating element 152 of FIG. 4 with the longer heat pipe 202 of FIG. 3. Additional and further variations and combinations are also possible, the preceding examples are provided for illustrative purposes only and are non-limiting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A dishwashing appliance, comprising:
a tub defining a wash chamber;
an inlet defined in the tub and providing fluid communication into the wash chamber;
a sump positioned at a bottom of the wash chamber for receiving fluid from the wash chamber;
a heater in operative communication with the sump;
a heat pipe heat exchanger comprising a condenser section and an evaporator section, the condenser section in operative communication with the wash chamber, the evaporator section in operative communication with the sump, and
a controller in operative communication with the heat pipe heat exchanger, wherein the controller is configured for:
flowing the fluid into the sump of the dishwashing appliance;
circulating the fluid between the sump and the wash chamber of the dishwashing appliance;
heating the fluid to a first temperature while circulating the fluid;
heating the fluid to a second temperature after circulating the fluid; and
transferring heat from the fluid to a flow of air flowing into the wash chamber after heating the fluid to the second temperature, wherein the step of transferring heat further comprises:
activating a fan to urge air across the condenser section of the heat pipe heat exchanger and into the wash chamber, and wherein the condenser section of the heat pipe heat exchanger is disposed directly in a heating conduit such that the air in the heating conduit directly contacts the condenser section of the heat pipe heat exchanger.

2. The dishwashing appliance of claim 1, wherein the heater comprises a submersible electric resistance heater positioned in the sump.

3. The dishwashing appliance of claim 1, further comprising a fluid circulation system configured to circulate fluid from the sump to the wash chamber, wherein the heater comprises a heating element in operative communication with at least one component of the fluid circulation system.

4. The dishwashing appliance of claim 3, wherein the at least one component of the fluid circulation system is a circulation pump.

5. The dishwashing appliance of claim 4, wherein the heating element is an inline heating element integrated with the pump.

6. The dishwashing appliance of claim 5, wherein the fan is proximate the inlet configured to urge air from the ambient environment through the inlet.

7. The dishwashing appliance of claim 1, wherein the tub is in fluid communication with an ambient environment around the dishwashing appliance via the inlet, and the condenser section of the heat pipe heat exchanger is proximate the inlet upstream of the wash chamber with respect to a flow direction of air flowing from the ambient environment into the wash chamber via the inlet.

8. The dishwashing appliance of claim 1, wherein the heating conduit extends between the water storage chamber and the inlet.

9. The dishwashing appliance of claim 8, wherein the heating conduit comprises an upstream end and a downstream end spaced apart from the upstream end, the condenser section of the heat pipe heat exchanger positioned at the upstream end of the heating conduit and the downstream end of the heating conduit positioned at the inlet.

10. The dishwashing appliance of claim 8, wherein the fan is configured to urge air from the heating conduit through the inlet and into the wash chamber.

11. A method of operating a dishwashing appliance, comprising:
- flowing a liquid into a sump of the dishwashing appliance;
- circulating the liquid between the sump and a wash chamber of the dishwashing appliance;
- heating the liquid to a first temperature while circulating the liquid;
- heating the liquid to a second temperature after circulating the liquid; and
- transferring heat from the liquid to a flow of air flowing into the wash chamber after heating the liquid to the second temperature, wherein the step of transferring heat further comprises:
  - transferring heat from the liquid to the flow of air via a heat pipe heat exchanger, and
  - activating a fan to urge air across a condenser section of the heat pipe heat exchanger and into the wash chamber, and wherein the condenser section of the heat pipe heat exchanger is disposed directly in a heating conduit such that the air in the heating conduit directly contacts the condenser section of the heat pipe heat exchanger.

12. The method of claim 11, further comprising deactivating the fan after a dry cycle is complete and draining the liquid from the sump after deactivating the fan.

13. The method of claim 11, wherein activating the fan urges air from an ambient environment around the dishwashing appliance across the condenser section of the heat pipe heat exchanger.

14. The method of claim 11, wherein activating the fan urges air from the heating conduit across the condenser section of the heat pipe heat exchanger, through the heating conduit, and into the wash chamber.

15. The method of claim 11, wherein the step of circulating comprises activating a circulation pump to pump the liquid from the sump to the wash chamber under pressure and the liquid returning to the sump from the wash chamber via gravity.

16. The method of claim 15, further comprising deactivating the circulation pump before heating the liquid to the second temperature.

17. The method of claim 11, wherein the step of heating the liquid to the first temperature comprises activating a heater in operative communication with the sump at a first level, further comprising deactivating the heater when the liquid reaches the first temperature, and wherein the step of heating the liquid to the second temperature comprises activating the heater at a second level.

* * * * *